(12) United States Patent
Tsukagoshi

(10) Patent No.: US 10,791,342 B2
(45) Date of Patent: Sep. 29, 2020

(54) CODING APPARATUS, CODING METHOD, DECODING APPARATUS, DECODING METHOD, TRANSMITTING APPARATUS, AND RECEIVING APPARATUS

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/325,797

(22) PCT Filed: Sep. 14, 2017

(86) PCT No.: PCT/JP2017/033332
§ 371 (c)(1),
(2) Date: Feb. 15, 2019

(87) PCT Pub. No.: WO2018/056181
PCT Pub. Date: Mar. 29, 2018

(65) Prior Publication Data
US 2020/0068222 A1     Feb. 27, 2020

(30) Foreign Application Priority Data

Sep. 26, 2016 (JP) ................................. 2016-186798

(51) Int. Cl.
H04N 19/70    (2014.01)
H04N 19/105    (2014.01)
(Continued)

(52) U.S. Cl.
CPC ........... *H04N 19/70* (2014.11); *H04N 19/105* (2014.11); *H04N 19/176* (2014.11); *H04N 19/513* (2014.11)

(58) Field of Classification Search
None
See application file for complete search history.

(56) References Cited

U.S. PATENT DOCUMENTS

2003/0185306 A1*  10/2003  MacInnis ............. H04N 19/122
                                                     375/240.25
2009/0074071 A1*  3/2009  Nagumo ................ H04N 19/53
                                                     375/240.16
(Continued)

FOREIGN PATENT DOCUMENTS

JP    2003-153273 A  *  5/2003  ............... H04N 7/32
JP    2003-153273 A       5/2003
(Continued)

OTHER PUBLICATIONS

International Search Report dated Oct. 10. 2017 in PCT/JP2017/033332 filed Sep. 14, 2017.
(Continued)

*Primary Examiner* — Reza Aghevli
(74) *Attorney, Agent, or Firm* — Oblon, McClelland, Maier & Neustadt, L.L.P.

(57) ABSTRACT

Moving image data of a wide viewing angle image is divided into blocks to obtain a coding target block. A motion-compensated reference block is extracted for each coding target block. The reference block is subjected to adjustment processing of rotation and/or scaling. A residual signal is calculated on the basis of a pixel value of the coding target block and a pixel value of the reference block subjected to the adjustment processing for each coding target block, and the residual signal of the coding target block is coded to obtain an encoded stream. Adjustment processing information is inserted into the encoded stream together with the motion vector for each coding target block. The residual can be reduced, the coding bit rate can be reduced, and consequently the coding performance of motion prediction can be improved.

8 Claims, 15 Drawing Sheets

(51) Int. Cl.
*H04N 19/176* (2014.01)
*H04N 19/513* (2014.01)

(56) References Cited

U.S. PATENT DOCUMENTS

| | | | | |
|---|---|---|---|---|
| 2012/0023249 | A1* | 1/2012 | Chen | H04N 21/43615 |
| | | | | 709/231 |
| 2012/0044990 | A1 | 2/2012 | Bivolarsky et al. | |
| 2012/0155532 | A1* | 6/2012 | Puri | H04N 19/124 |
| | | | | 375/240.02 |
| 2012/0194685 | A1 | 8/2012 | Kawakami et al. | |
| 2013/0089149 | A1* | 4/2013 | Hayashi | H04N 19/51 |
| | | | | 375/240.16 |
| 2013/0136185 | A1* | 5/2013 | Tian | H04N 19/50 |
| | | | | 375/240.16 |
| 2013/0194386 | A1* | 8/2013 | Leontaris | H04N 19/147 |
| | | | | 348/43 |
| 2013/0279751 | A1 | 10/2013 | Bruna et al. | |
| 2013/0322530 | A1* | 12/2013 | Rossato | H04N 19/59 |
| | | | | 375/240.12 |
| 2013/0335522 | A1* | 12/2013 | Zhang | H04N 19/597 |
| | | | | 348/43 |
| 2014/0301463 | A1* | 10/2014 | Rusanovskyy | H04N 19/39 |
| | | | | 375/240.14 |
| 2015/0358644 | A1* | 12/2015 | Sugimoto | H04N 19/577 |
| | | | | 375/240.12 |
| 2016/0212373 | A1* | 7/2016 | Aharon | H04N 19/513 |
| 2016/0212423 | A1* | 7/2016 | Aharon | H04N 19/167 |
| 2016/0212433 | A1* | 7/2016 | Zhu | H04N 19/132 |
| 2016/0295241 | A1* | 10/2016 | Shimizu | H04N 19/597 |
| 2017/0347026 | A1* | 11/2017 | Hannuksela | H04L 67/02 |
| 2019/0014337 | A1* | 1/2019 | Skupin | H04N 19/174 |
| 2019/0082184 | A1* | 3/2019 | Hannuksela | H04N 19/70 |
| 2019/0297339 | A1* | 9/2019 | Hannuksela | H04N 19/176 |

FOREIGN PATENT DOCUMENTS

| | | | |
|---|---|---|---|
| JP | 2003-339017 A | 11/2003 | |
| JP | 2004-159132 A | 6/2004 | |
| JP | 2004159132 A * | 6/2004 | H04N 7/32 |
| JP | 2007-181226 A | 7/2007 | |
| JP | 2008-193458 A | 8/2008 | |
| JP | 2009-200939 A | 9/2009 | |
| JP | 2012-160886 A | 8/2012 | |
| WO | WO 2011/101448 A2 | 8/2011 | |

OTHER PUBLICATIONS

Extended European Search Report dated Jun. 18, 2019 in Patent Application No. 17852954.1, 11 pages.

Lin, S. et al. "Affine transform prediction for next generation video coding" MPEG Meeting, International Organisation for Standardisation Organisation Internationale de Normalisation ISO/IEC JTC1/SC29/WG11 Coding of Moving Pictures and Audio, ISO/IEC JTC1/SC29/WG11 MPEG2015/ m37525, XP030065892, 2015, 10 pages.

Zou, F. et al. "Improved affine motion prediction" JVET Meeting, Joint Video Exploration Team (JVET) of ITU-T SG 16 WP 3 and ISO/IEC JTC 1/SC 29/WG 11, XP030150164, 2016, 5 pages.

* cited by examiner

OMNIDIRECTIONAL IMAGE

O: REFERENCE POINT

IMAGE AFTER PANORAMIC DEVELOPMENT

| Syntax | Type |
|---|---|
| slice_segment_header() | |
| slice_segment_data() | |

(b)

| Syntax | Type |
|---|---|
| slice_segment_header(){ | |
| slice_type | |
| reference_pic_set_idx | |
| ref_list | |
| angled_prediction_enable_flag | ae(v) |
| } | |

FIG. 12

| Syntax | Type |
|---|---|
| slice_segment_data(){ | |
| ~LOOP OF EACH ENCODED block~ | |
| coding_unit(){ | |
| prediction_unit(){ | |
| prediction_unit_size | ae(v) |
| ref_idx_l0 | ae(v) |
| ref_idx_l1 | ae(v) |
| mvd_coding( x0, y0, mvx0_l0, mvy0_l0, ref_idx_l0) | |
| mvd_coding( x0, y0, mvx0_l1, mvy0_l1, ref_idx_l1) | |
| if(angled_prediction_enabled_flag){ | |
| ref_block_adjust_proc(x0, y0, mvx0, mvy0, ref_idx_l0 ) | |
| ref_block_adjust_proc(x0, y0, mvx1, mvy1, ref_idx_l1 ) | |
| } | |
| residual_coding(x0, y0, transformsize) | |
| } | |
| ~ | |
| } | |

FIG. 13

| Syntax | Type |
|---|---|
| ref_block_adjust_proc(x, y, mvx, mvy, ref_idx ) { | |
|   rotation_degree | ae(v) |
|   scaling_ratio | ae(v) |
| } | |

FIG. 14

Semantics rotation_degree
REPRESENT THE ANGLE FOR ROTATING THE REFERENCE BLOCK COUNTERCLOCKWISE IN A HUNDREDFOLD VALUE. ASSUME THAT THE REFERENCE POINT OF ROTATION AND MAGNIFICATION/REDUCTION IS THE top-left POINT OF THE REFERENCE BLOCK.
(EXAMPLE)  rotation_degree = 1250 MEANS TO ROTATE COUNTERCLOCKWISE BY 12.5 DEGREES scaling_ratio
REPRESENT A MAGNIFICATION/REDUCTION RATIO BASED ON THE BLOCK SIZE OF THE REFERENCE TARGET IMAGE IN A HUNDREDFOLD VALUE.
(EXAMPLE)  scaling_ratio = 100 MEANS NO MAGNIFICATION
scaling_ratio = 15 MEANS 0.15-FOLD
scaling_ratio = 366 MEANS 3.66-FOLD

CODING APPARATUS, CODING METHOD, DECODING APPARATUS, DECODING METHOD, TRANSMITTING APPARATUS, AND RECEIVING APPARATUS

TECHNICAL FIELD

The present technology relates to a coding apparatus, a coding method, a decoding apparatus, a decoding method, a transmitting apparatus, and a receiving apparatus. In particular, the present disclosure relates to a coding apparatus and the like for encoding moving image data of a wide viewing angle image.

BACKGROUND ART

A wide viewing angle image, which is captured using a mirror, a lens, or the like corresponding to a wide viewing angle, is deformed according to the distance from the center of the image. For example, Patent Document 1 describes an omnidirectional image as the wide viewing angle image and the like.

In the case of encoding the moving image data of the wide viewing angle image, if motion prediction is performed by translating block-shaped data according to a conventional method with respect to a reference image, a residual may become large and a coding bit rate may undesirably increase.

CITATION LIST

Patent Document

Patent Document 1: Japanese Patent Application Laid-Open No. 2009-200939

SUMMARY OF THE INVENTION

Problems to be Solved by the Invention

An object of the present technology is to successfully encode moving image data of a wide viewing angle image.

Solution to Problems

A concept of the present technology lies in a transmitting apparatus including
a coding apparatus that encodes moving image data of a wide viewing angle image to obtain an encoded stream, and
a transmitting unit that transmits a container including the encoded stream in a predetermined format, in which
the coding apparatus includes
a block dividing unit that divides the moving image data of the wide viewing angle image into blocks to obtain coding target blocks,
a reference block extracting unit that extracts a motion-compensated reference block for each coding target block,
a reference block adjusting unit that performs adjustment processing of rotation and/or scaling on the reference block,
a coding unit that calculates a residual signal on the basis of a pixel value of the coding target block and a pixel value of the reference block subjected to the adjustment processing, for each coding target block, and encodes the residual signal of each coding target block to obtain the encoded stream, and
an information inserting unit that inserts information of the adjustment processing together with a motion vector into the encoded stream, for each coding target block.

The present technology provides the transmitting apparatus including the coding apparatus and the transmitting unit. The coding apparatus encodes moving image data of a wide viewing angle image to obtain an encoded stream. The transmitting unit transmits a container in a predetermined format including the encoded stream. For example, the wide viewing angle image may be an omnidirectional image.

The coding apparatus includes a block dividing unit, a reference block extracting unit, a reference block adjusting unit, a coding unit, and an information inserting unit. The block dividing unit divides the moving image data of the wide viewing angle image into blocks to obtain the coding target block. The reference block extracting unit extracts motion-compensated reference blocks for each coding target block.

The reference block adjusting unit performs adjustment processing of rotation and/or scaling on the reference block. For example, the reference block adjusting unit may automatically determine the rotation angle from the positions of the reference block and the encoding target block.

Furthermore, for example, the reference block adjusting unit may perform rotation processing on each candidate before block matching in which the reference block extracting unit extracts the reference block. Furthermore, for example, the reference block adjusting unit may perform rotation processing on the result of block matching in which the reference block extracting unit extracts the reference block.

The coding unit calculates the residual signal for each coding target block on the basis of the pixel value of the coding target block and the pixel value of the reference block subjected to the adjustment processing, and encodes the residual signal of each coding target block to obtain the encoded stream. Then, the information inserting unit inserts, into the encoded stream, the adjustment processing information together with the motion vector for each coding target block.

In this way, the present technology performs the adjustment processing of rotation and/or scaling on the reference blocks. Therefore, the residual can be reduced, the coding bit rate can be decreased, and consequently the coding performance of motion prediction can be improved. Furthermore, the present technology inserts the adjustment processing information into the encoded stream, together with the motion vector, for each coding target block. Therefore, on the decoding side, the motion-compensated reference block can be easily and appropriately obtained on the basis of the information of the adjustment processing together with the motion vector, and the decoding processing can be easily and appropriately performed.

Furthermore, another concept of the present technology is a receiving apparatus, including
a receiving unit that receives a container in a predetermined format including an encoded stream obtained by encoding moving image data of a wide viewing angle image, and
a decoding apparatus that decodes the encoded stream to obtain the image data of the wide viewing angle image, in which
the decoding apparatus includes
a decoding unit that decodes the encoded stream to obtain a residual signal for each decoding target block,
the encoded stream including a motion vector and adjustment processing information of rotation and/or scaling inserted into the encoded stream for obtaining a reference block, for each coding target block, the decoding apparatus further includes a reference block extracting unit that extracts a reference block for each decoding target block on the basis of the motion vector and the adjustment processing information for each block, and a pixel value calculating unit that adds a pixel value of the reference block to the residual signal for each decoding target block to obtain the moving image data of the wide viewing angle image.

The present technology provides the receiving apparatus that includes the receiving unit and the decoding apparatus. The receiving unit receives the container in the predetermined format that includes the encoded stream obtained by encoding the moving image data of the wide viewing angle image. The decoding apparatus decodes the encoded stream to obtain image data of the wide viewing angle image.

The decoding apparatus includes the decoding unit, the reference block extracting unit, and the pixel value calculating unit. The decoding unit decodes the encoded stream to obtain the residual signal for each decoding target block. The encoded stream receives a motion vector and adjustment processing information of rotation and/or scaling inserted into the encoded stream for obtaining the reference block for each encoding target block.

The reference block extracting unit extracts the reference block for each decoding target block on the basis of the motion vector and the adjustment processing information for each block. Then, the pixel value calculating unit adds the pixel value of the reference block to the residual signal for each decoding target block, and obtains the moving image data of the wide viewing angle image.

In this way, the present technology extracts the reference blocks for each decoding target block on the basis of the motion vector for each block and the adjustment processing information inserted into the encoded stream. Therefore, the motion-compensated reference block can be obtained easily and appropriately, and the decoding process can be performed easily and appropriately.

Effects of the Invention

According to the present technology, the moving image data of the wide viewing angle image can be encoded satisfactorily. Note that the effects listed herein are not limiting, and any one effect disclosed herein may be obtained.

BRIEF DESCRIPTION OF DRAWINGS

FIG. 11 illustrates an example structure of a slice NAL unit.

FIG. 12 illustrates an example structure of slice segment data.

FIG. 13 illustrates an example structure of a field of "ref_block_adjust_proc (x, y, mvx, mvy, ref_idx)".

FIG. 14 illustrates contents of main information in the example structure of the field of "ref_block_adjust_proc (x, y, mvx, mvy, ref_idx)".

MODE FOR CARRYING OUT THE INVENTION

A mode for carrying out the invention (hereinafter referred to as an embodiment) will be described below. Note that the description is given in the following order:
1. Embodiment
2. Modification 1. Embodiment

[Transmission and Reception System]

Figure 1:
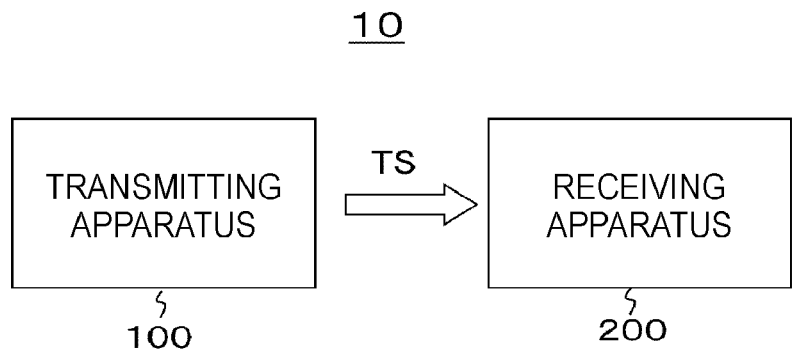
FIG. 1 is a block diagram illustrating a configuration example of an embodiment of a transmission and reception system.

FIG. 1 illustrates a configuration example of an embodiment of a transmission and reception system 10. The transmission and reception system 10 includes a transmitting apparatus 100 and a receiving apparatus 200.

The transmitting apparatus 100 transmits a transport stream TS as a container on a broadcast wave. The transport stream TS includes an encoded stream (video stream) obtained by encoding a wide viewing angle image of an omnidirectional image in this embodiment.

Figure 2:
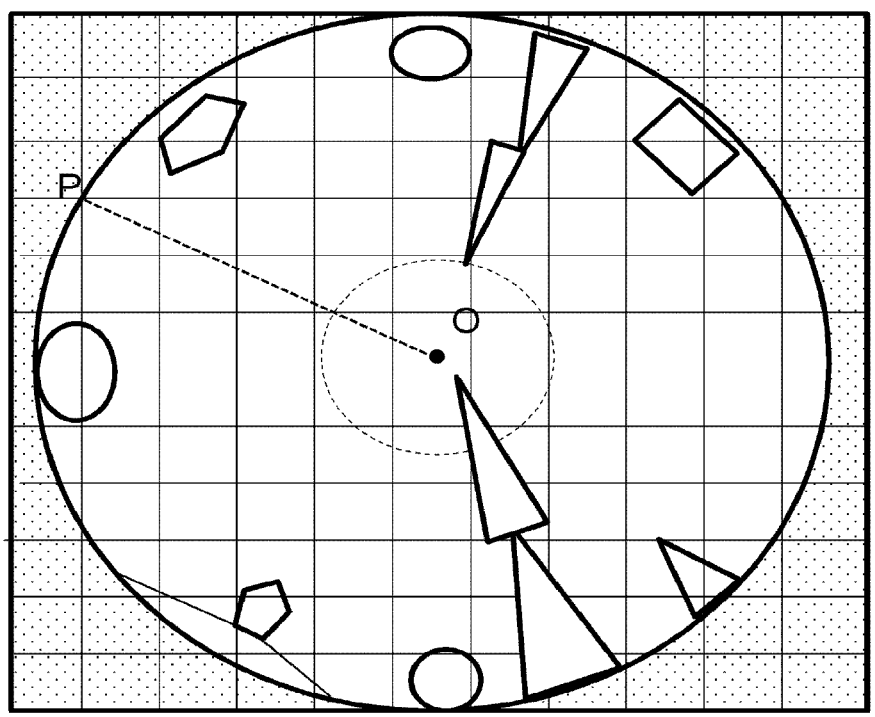
FIG. 2 illustrates an example of an omnidirectional image captured by an omnidirectional camera.
Figure 3:
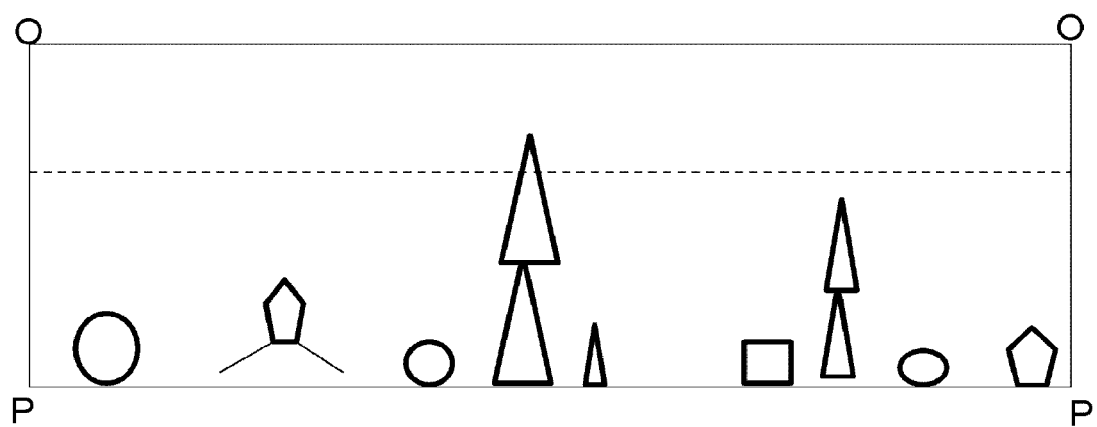
FIG. 3 illustrates an example of an image obtained after panoramic development of the omnidirectional image.

FIG. 2 illustrates an example of an omnidirectional image captured by an omnidirectional camera. The omnidirectional camera performs imaging using, for example, a hyperboloidal mirror, as well known in the art. A reference point (target point) O is set in the omnidirectional image. The omnidirectional image has a 360-degree image centered on the reference point O. By panoramically developing the omnidirectional image, a two-dimensional 360-degree image is obtained, as illustrated in FIG. 3. The omnidirectional image, which is for example imaged using a hyperboloidal mirror as described above, is deformed according to a distance and an angular position from the reference point O.

The transmitting apparatus 100 performs, for example, motion compensation predictive coding and, when extracting a motion-compensated reference block for each coding target block, adjusts the rotation and/or scaling (linear, non-linear) to the reference block. Accordingly, a residual and a coding bit rate are decreased, even if the omnidirectional image is deformed as described above, and the performance of the motion prediction coding is improved. For example, the angle of rotation is automatically determined from the positions of the reference block and the encoding target block.

The transmitting apparatus 100 inserts adjustment processing information together with the motion vector into the encoded stream for each coding target block. Accordingly, the motion-compensated reference block is obtained easily and appropriately, together with the motion vector, on the receiving side (decoding side) on the basis of the adjustment processing information, while decoding processing is performed easily and appropriately to satisfactorily obtain omnidirectional moving image data.

The receiving apparatus 200 receives the above-described transport stream TS transmitted from the transmitting apparatus 100 on the broadcast wave. As described above, the transport stream TS includes an encoded stream (video stream) obtained by encoding moving image data of the omnidirectional moving image data. Then, the encoded stream includes adjustment processing information inserted into the encoded stream together with the motion vector for each coding target block.

The receiving apparatus 200 extracts a reference block for each decoding target block on the basis of the motion vector and rotation and/or scaling adjustment processing information inserted into the encoded stream for each block. Accordingly, the motion-compensated reference block is obtained easily and appropriately, while decoding processing is performed easily and appropriately to satisfactorily obtain omnidirectional moving image data.

<Configuration of Transmitting Apparatus>

Figure 4:
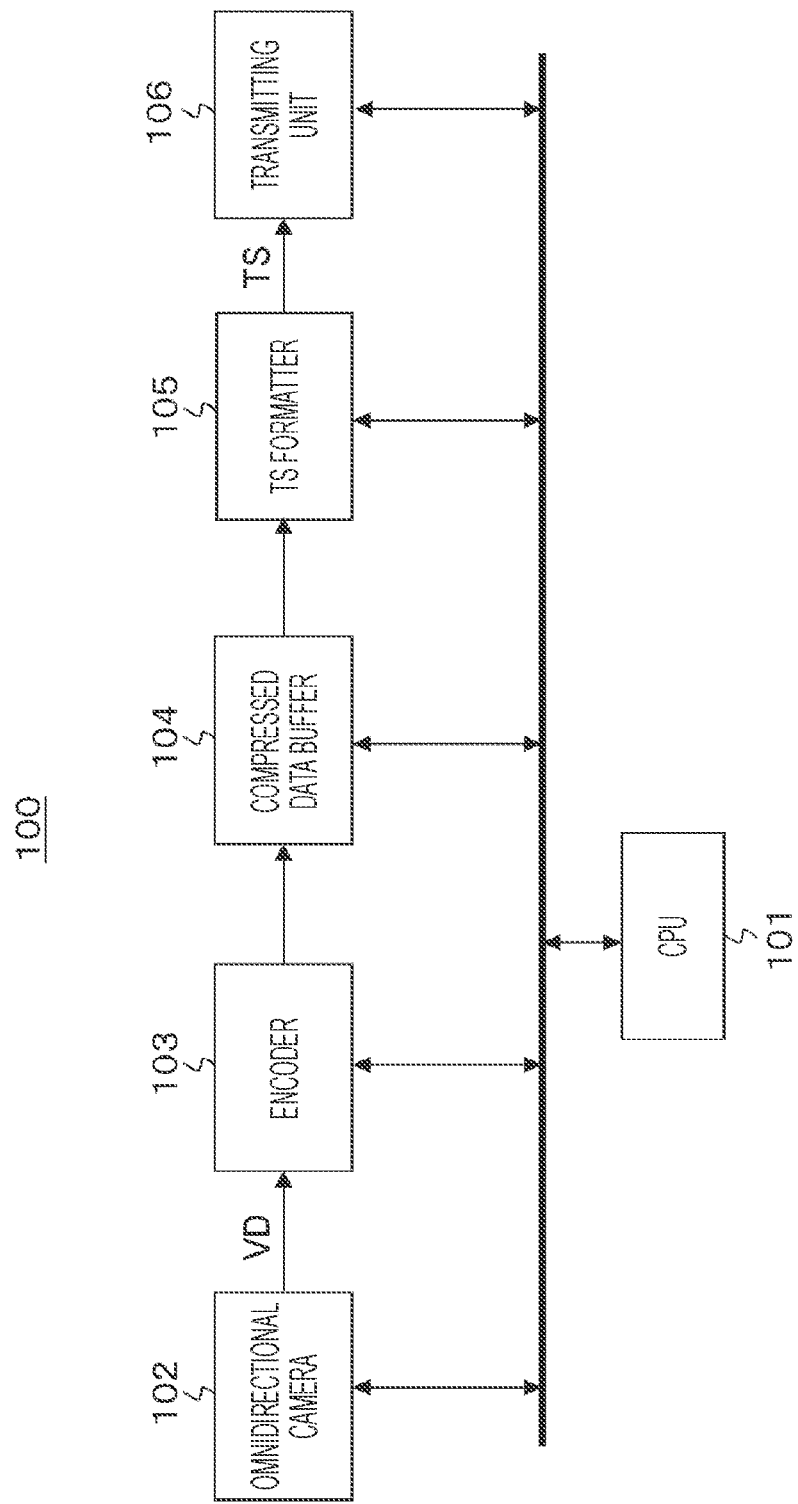
FIG. 4 is a block diagram illustrating a configuration example of a transmitting apparatus.

FIG. 4 illustrates a configuration example of the transmitting apparatus 100. The transmitting apparatus 100 includes a central processing unit (CPU) 101, an omnidirectional camera 102, an encoder 103, a compressed data buffer 104, a TS formatter 105, and a transmitting unit 106.

The CPU 101 is a control unit that controls the operation of each unit of the transmitting apparatus 100. The omnidirectional camera 102 captures an image of a subject to obtain moving image data VD of omnidirectional images. The encoder 103 encodes the moving image data VD of the omnidirectional images in accordance with AVC or HEVC, for example, to obtain an encoded stream (video stream).

The encoder 103 performs motion compensation predictive encoding and, when extracting a motion-compensated reference block for each encoding target block, performs rotation and/or scaling adjustment processing on the reference block. Accordingly, the residual difference and the coding bit rate are decreased, and the performance of the motion prediction coding is improved. For example, the angle of rotation is automatically determined from the positions of the reference block and the encoding target block.

Figure 5:
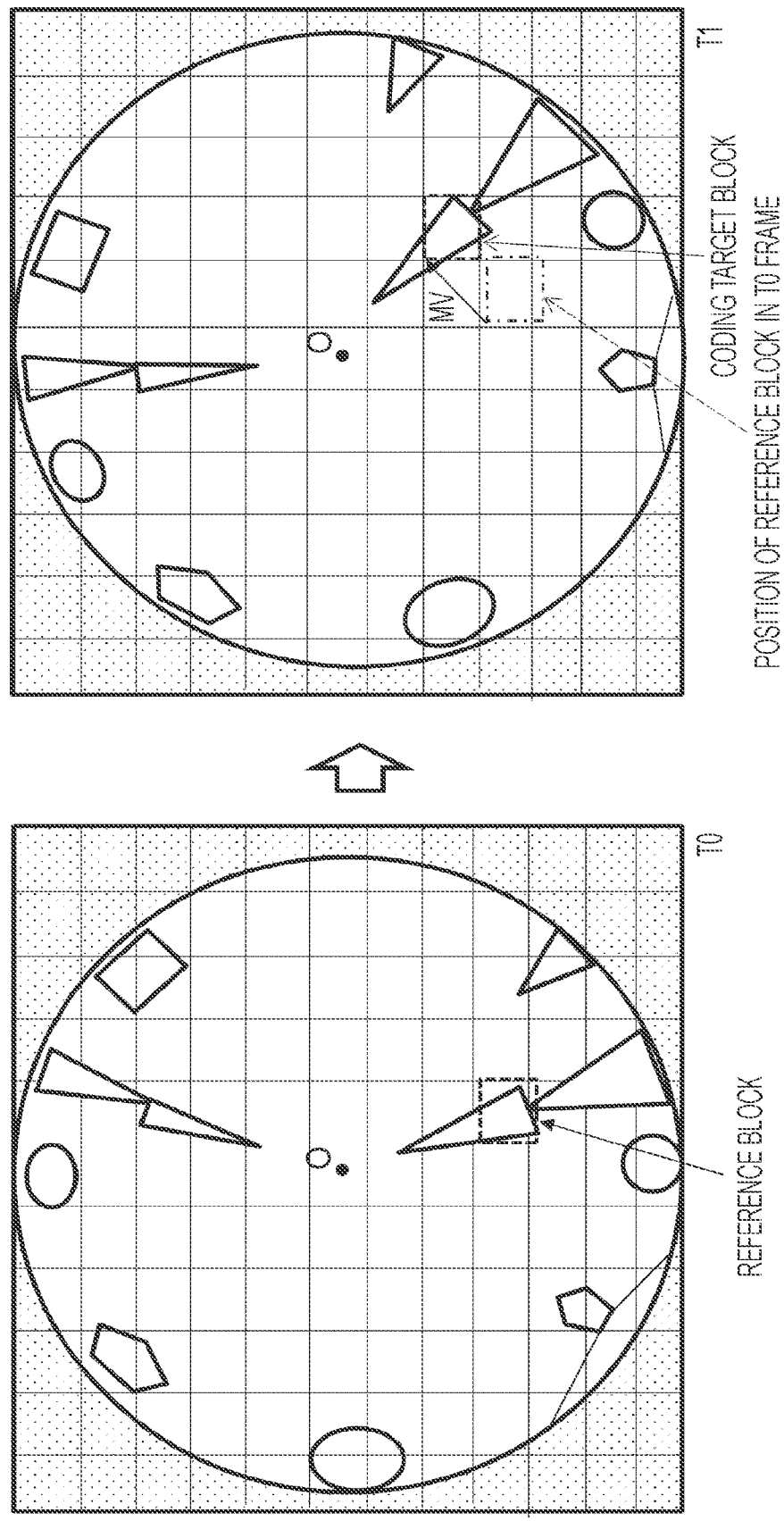
FIG. 5 illustrates an example of application of motion prediction by conventional block translation.

FIG. 5 illustrates an application example of motion prediction by conventional block translation. The left view illustrates a reference frame (past frame) at time T0, and the right view illustrates an encoding target frame (current frame) at time T1. A reference block is determined in the reference block, corresponding to the encoding target block of the encoding target frame, by motion detection processing, such as block matching, in a manner to minimize the residual which is a difference between the coding target block and the reference block. MV represents a motion vector.

Figure 7:
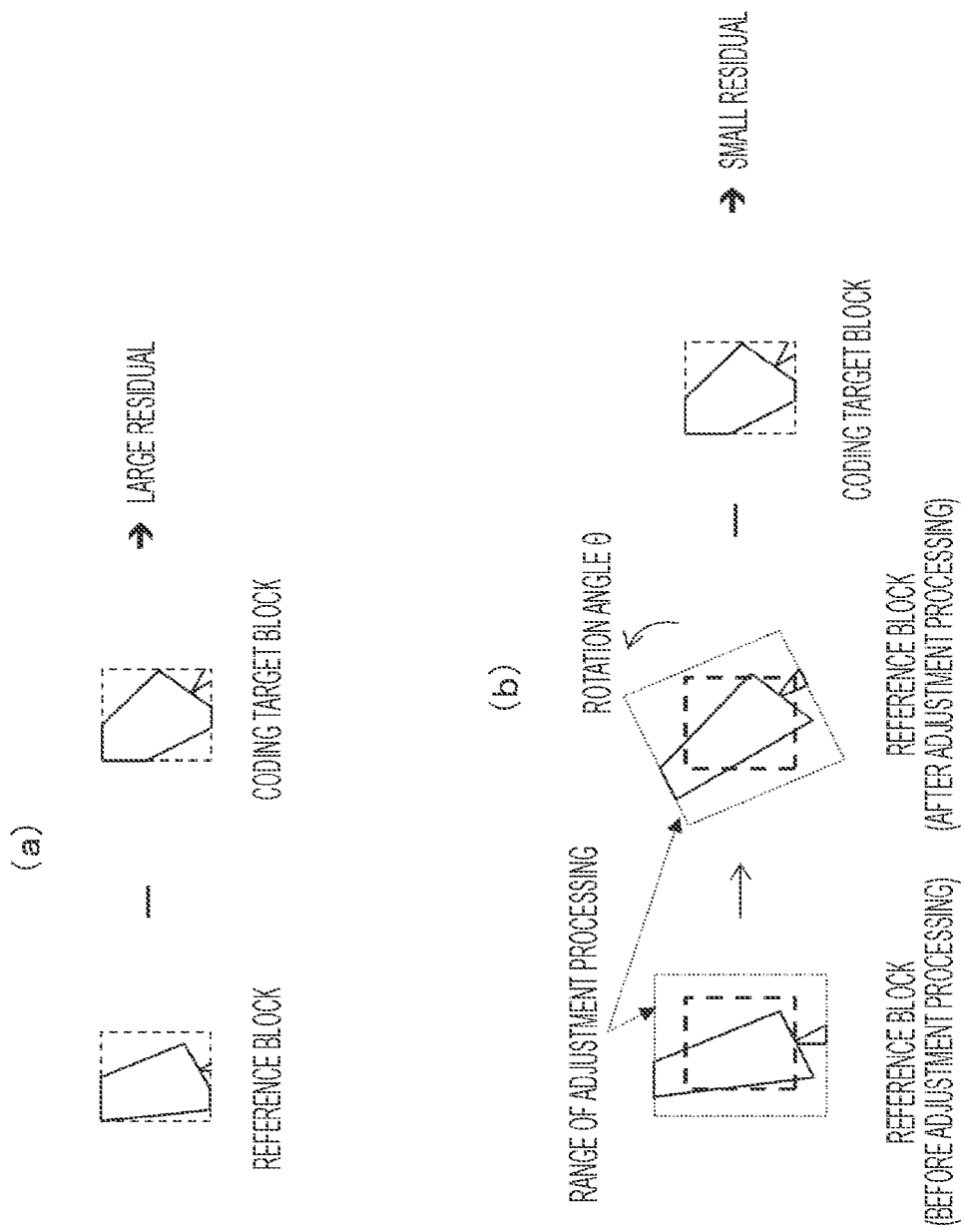
FIG. 7 illustrates comparison between the example of application of the motion prediction by the conventional block translation and the example of application of the motion prediction through the reference block adjustment.

The omnidirectional images do not simply move in a translation manner even when the object makes a translational movement over time in real space, but moves with rotation and/or scaling. Therefore, the image in the encoding target block is rotated and/or scaled with respect to the image in the reference block. Therefore, as illustrated in FIG. 7(a), the residual, that is the difference taken between the pixel value of the reference block and the pixel value of the encoding target block, is large.

Figure 6:
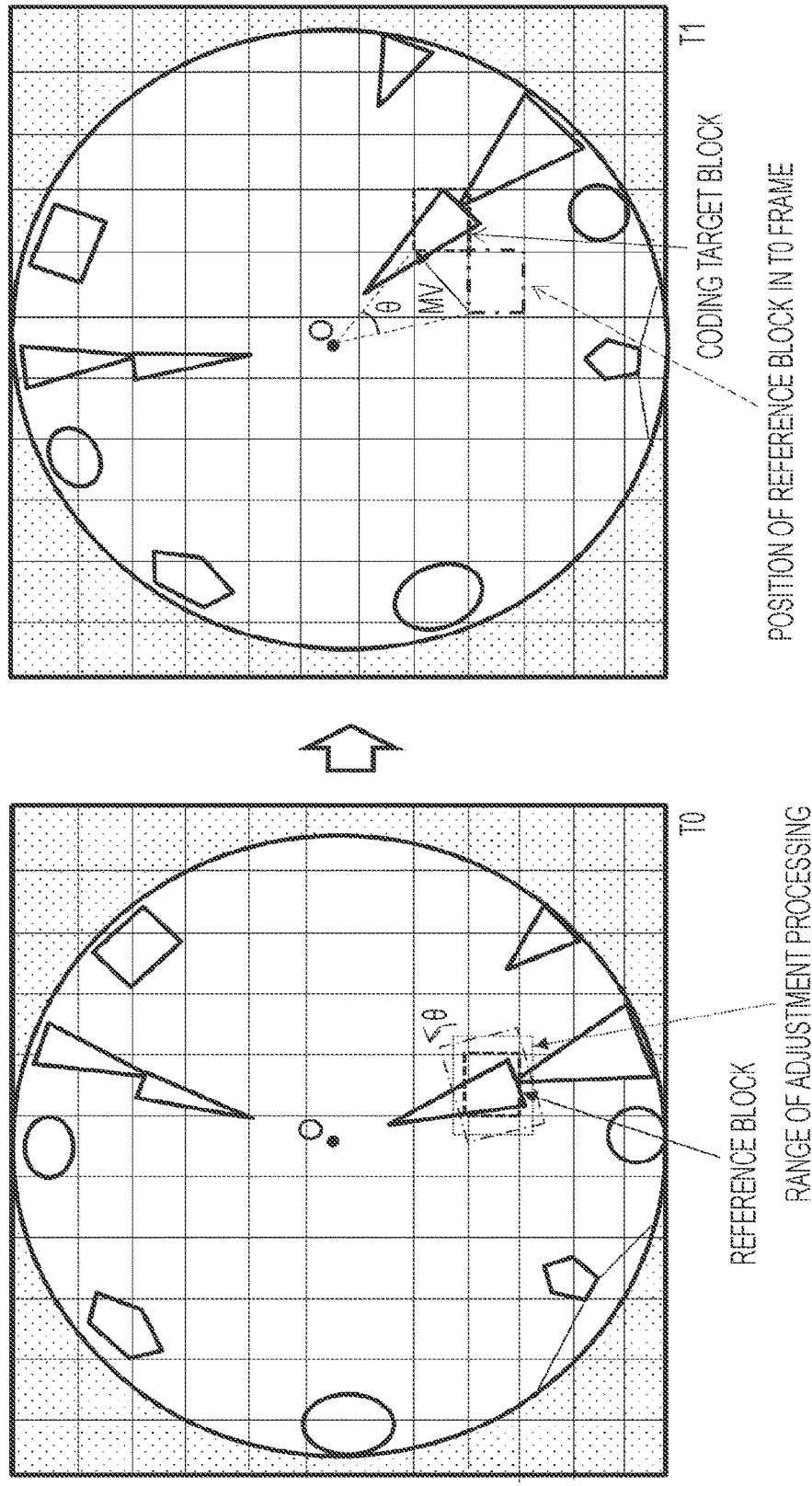
FIG. 6 illustrates an example of application of motion prediction through reference block adjustment.

FIG. 6 illustrates an example of application of motion prediction through reference block adjustment. The left view illustrates a reference frame (past frame) at time T0, and the right view illustrates an encoding target frame (current frame) at time T1. A reference block (before adjustment) is determined in the reference block, corresponding to the encoding target by the block of the encoding target frame, by motion detection processing, such as block matching, in a manner to minimize the residual error which is the difference between the encoding target block and the reference block. MV represents a motion vector.

An angle $\theta$ formed between the encoding target block and the reference block with respect to the reference point O is determined. Then, an adjustment processing range covering a range including the reference block is set in the reference frame, and the image in the adjustment processing range is rotated by the angle $\theta$ and, as necessary, is subjected to predetermined scaling processing. Therefore, after the adjustment processing, as illustrated in FIG. 7(b), the image in the reference block before the adjustment processing has been rotated by the angle $\theta$ and further scaled. The residual, that is the difference taken between the pixel values of the reference block and pixel values of the encoding target block, is small.

Figure 8:
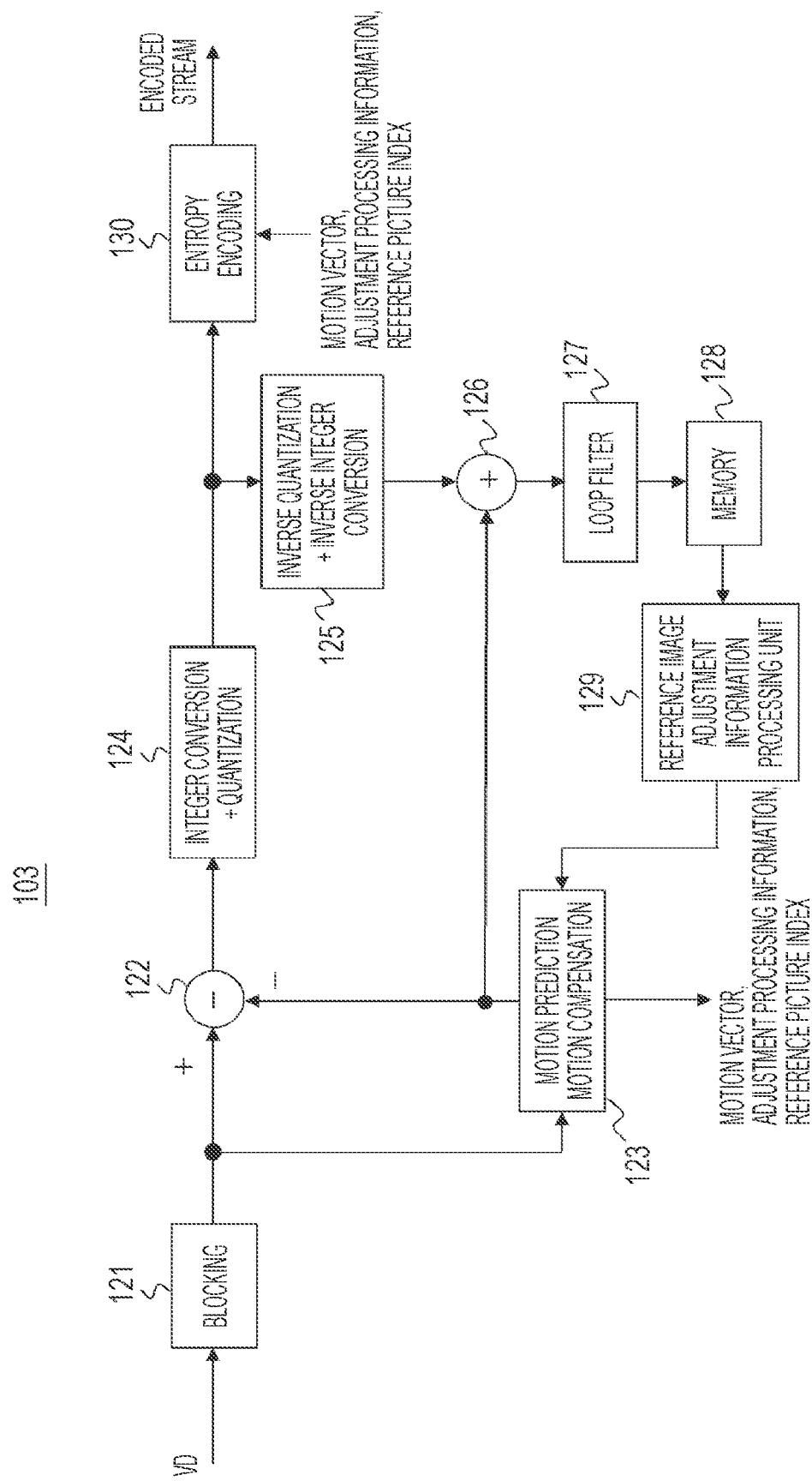
FIG. 8 is a block diagram of a configuration example of a coding processing portion of an encoder of a transmitting apparatus.

FIG. 8 illustrates a configuration example of the encoding processing portion of the encoder 103. The encoder 103 includes a blocking circuit 121, a subtraction circuit 122, a motion prediction/motion compensation circuit 123, an integer conversion/quantization circuit 124, an inverse quantization/inverse integer conversion circuit 125, an adder circuit 126, a loop filter 127, a memory 128, a reference image adjustment information processing unit 129, and an entropy coding circuit 130.

The moving image data VD of the omnidirectional image is input to the blocking circuit 121. In the blocking circuit 121, image data of each picture constituting the moving image data VD is divided into coding target blocks (MB: macroblock) as units of coding processing. The encoding target blocks are sequentially supplied to the subtraction circuit 122.

The motion prediction/motion compensation circuit 123 extracts a motion-compensated reference block (prediction reference block) for each encoding target block on the basis of the image data of the reference picture stored in the memory 128. This reference block has been subjected to the adjustment processing, such as the rotation and/or the scaling as described above in the reference image adjustment information processing unit 129 (see FIGS. 6 and 7(b)).

Note that the reference image adjustment information processing unit 129 performs (1) the rotation or scaling processing on each candidate before block matching in which the motion prediction/motion compensation circuit 123 extracts a reference block. Alternatively, the reference image adjustment information processing unit 129 performs (2) the rotation or scaling processing on the result of the block matching in which the motion prediction/motion compensation circuit 123 extracts a reference block.

Figure 9:
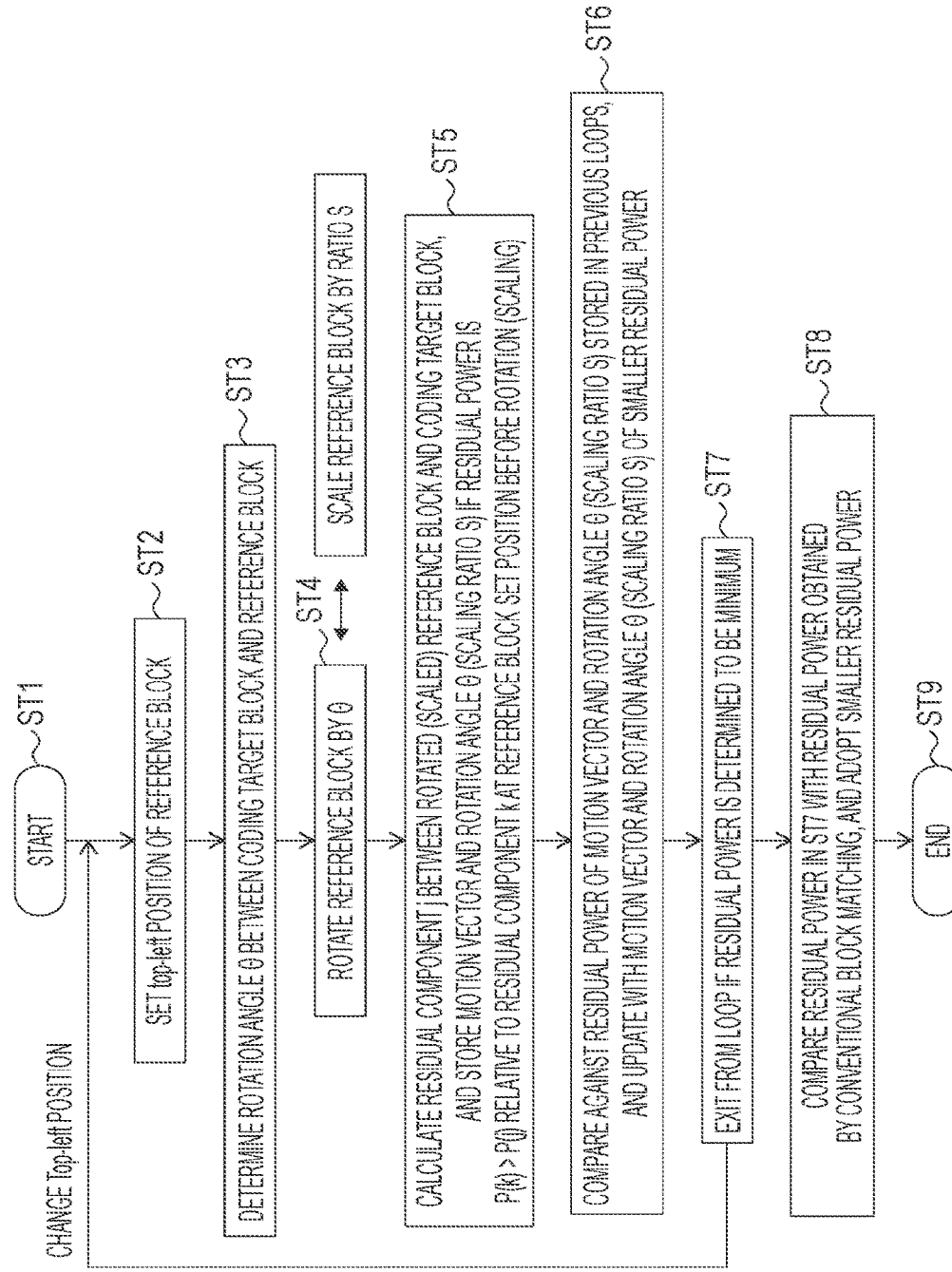
FIG. 9 illustrates an example of a processing flow in a motion prediction/motion compensation circuit and a reference image adjustment information processing unit.

FIG. 9 illustrates the processing flow in the motion prediction/motion compensation circuit 123 and the reference image adjustment information processing unit 129 in the case of (1). First, in step ST1, the processing starts. Next, in step ST2, a top-left position of the reference block is set. Next, in step ST3, a rotation angle $\theta$ between the encoding target block and the reference block is obtained.

Next, in step ST4, the reference block is rotated by θ. Furthermore, the reference block is scaled by the ratio S. Note that the reference point for rotation and scaling is the top-left point of the reference block. Next, in step ST5, a residual component j is calculated between the reference block which has been rotated (scaled) and the coding target block. In the case where the residual power is P(k)>P(j) with respect to a residual component k at the reference block setting position before rotation (scaling), the motion vector and the rotation angle θ (scaling ratio S) are stored.

Note that each rotated (scaled) reference block may be determined previously for the neighboring region of the coding target block by prefetch processing based on the angle information. In step ST6, the motion vector stored in the previous loops is compared to the residual power according to the motion vector and the rotation angle θ (scaling ratio S), and the motion vector having a smaller residual power and the rotation angle θ (scaling ratio S) are used for update. Furthermore, if the residual power in the loop is not determined to be the minimum residual power in step ST7, the top-left position of the reference block is changed and the above-described processing is repeated. On the other hand, the process goes out of the loop if it is determined that the residual power is minimum. In step ST8, the residual power of ST7 is compared to the residual power by the conventional block matching, and the smaller value is adopted. Thereafter, in step ST9, the processing ends.

Figure 10:
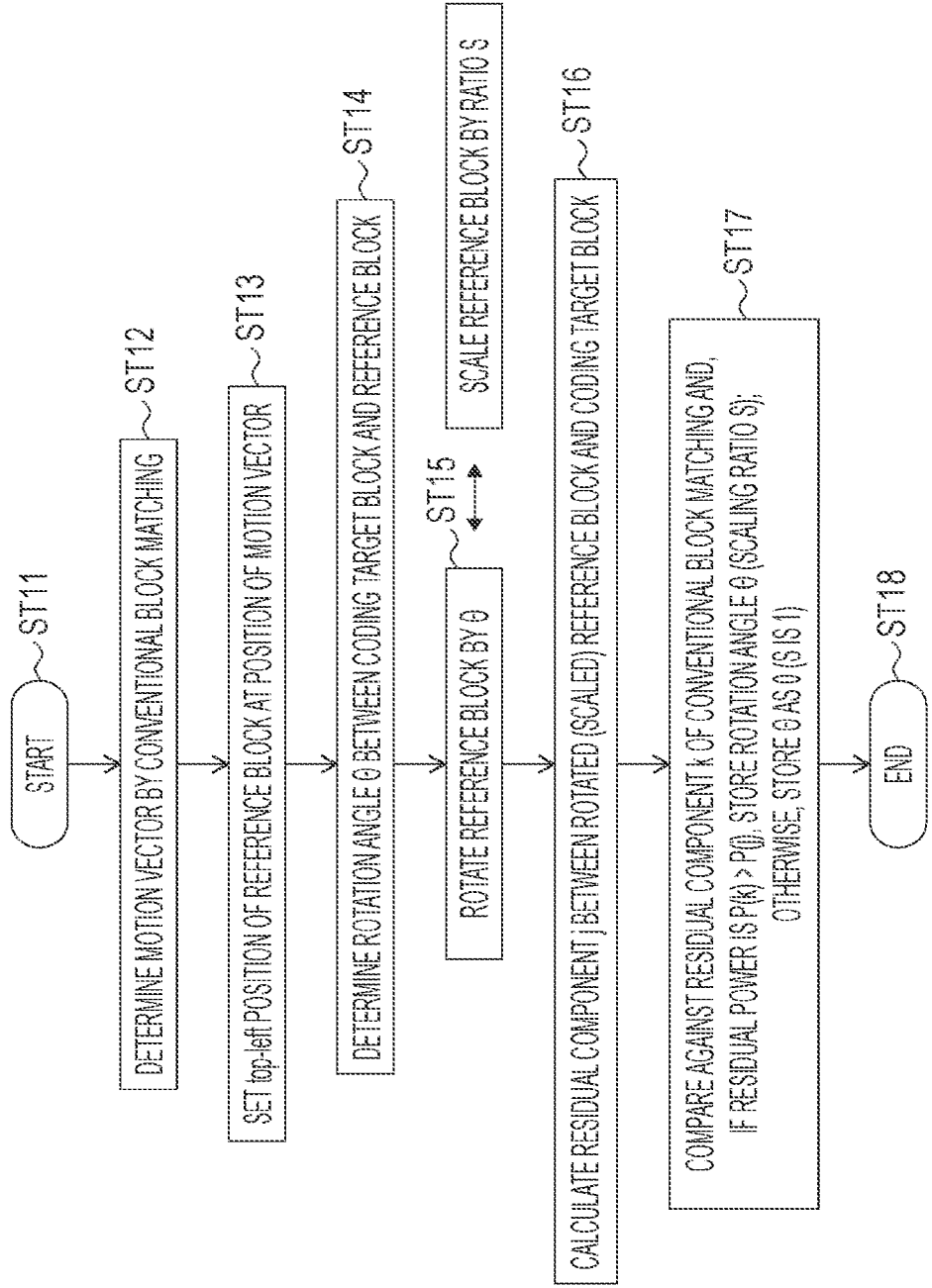
FIG. 10 illustrates another example of the processing flow in the motion prediction/motion compensation circuit and the reference image adjustment information processing unit.

FIG. 10 illustrates the process flow in the motion prediction/motion compensation circuit 123 and the reference image adjustment information processing unit 129 in the case of (1). First, in step ST11, the processing starts. Next, in step ST12, a motion vector according to the conventional block matching is obtained.

Next, in step ST13, the top-left position of the reference block at the position of the motion vector is set. Next, in step ST14, a rotation angle θ between the coding target block and the reference block is obtained. Next, in step ST15, the reference block is rotated by θ. Furthermore, the reference block is scaled by the ratio S. Note that the reference point for rotation and scaling is the top-left point of the reference block.

Next, in step ST16, a residual component j is calculated between the reference block which has been rotated (scaled) and the coding target block. Next, in step ST17, the residual component k is compared with the residual component k by the conventional block matching method. In the case where the residual power is P(k)>P(j), the adjustment information (information of the rotation angle θ and the scaling ratio S) Is stored. Otherwise, the adjustment information (rotation angle θ=0 and scaling ratio S=1) is stored. After the processing of step ST17, the processing ends at step ST18.

Returning to FIG. 8, the reference blocks obtained by the motion prediction/motion compensation circuit 123 are sequentially supplied to the subtraction circuit 122. The subtraction circuit 122 performs subtraction processing between each coding target block and the reference block for each coding target block obtained in the blocking circuit 121, thus obtaining a prediction error (residual signal). The prediction error for each encoding target block is quantized after integer conversion (e.g., DCT conversion) in an integer conversion/quantization circuit 124.

The quantized data for each encoding target block obtained by the integer conversion/quantization circuit 124 is supplied to an inverse quantization/inverse integer conversion circuit 125. In the inverse quantization/inverse integer conversion circuit 125, inverse quantization is applied to the quantized data, further subjected to inverse integer transformation, and a prediction error is obtained. This prediction error is supplied to the adder circuit 126.

The adder circuit 126 adds the motion-compensated reference block to the prediction error to obtain a block. This block is accumulated in the memory 128 after the quantization noise is removed by the loop filter 127.

Furthermore, the quantized data for each encoding target block obtained by the integer conversion/quantization circuit 124 is supplied to the entropy coding circuit 130, entropy coding is performed, and the encoded stream (video stream) is obtained. Note that information, such as a reference picture index, a motion vector, and adjustment processing information, for each encoding target block is added to the encoded stream as MB header information for decoding on the receiving side.

FIG. 11(a) illustrates an example structure of a NAL unit of a slice that forms a container of the encoded data. The NAL includes a slice segment header (slice_segment_header ( )) and slice segment data (slice_segment_data ( )). FIG. 11(b) illustrates a configuration example of the structure of the slice/segment header. The "angled_prediction_enable_flag" field represents flag information indicating whether or not the reference block has been subjected to the adjustment processing at the time of coding. "1" indicates that adjustment processing has been applied, and "0" indicates that adjustment processing has not been applied.

FIG. 12 illustrates an example structure of slice segment data. Note that this example structure illustrates an example case of performing bidirectional prediction. "ref_idx_10" and "ref_idx_11" are fields each indicating a reference picture index. "mvd_coding (x0, y0, mvx0_10, mvy0_10, ref_idx_10)" and "mvd_coding (x0, y0, mvx0_11, mvy0_11, ref_idx_11)" are fields indicating the position and motion vector of the prediction source of the coding block, and the index of the reference picture, respectively.

Furthermore, if "angled_prediction_enable_flag" is "1", "ref_block_adjust_proc (x0, y0, mvx0, mvy0, ref_idx_10)" and "ref_block_adjust_proc (x0, y0, mvx1, mvy1, ref_idx_11)" fields are present. These fields provide adjustment processing information (information of the rotation angle θ and the scaling ratio S, together with the position and motion vector of the prediction source of the coding block and the index of the reference picture, respectively).

FIG. 13 illustrates an example structure of "ref_block_adjust_proc (x, y, mvx, mvy, ref_idx)" field. FIG. 14 illustrates contents of main information of the example structure. The "rotation_degree" field indicates the rotation angle θ. This field indicates the rotation angle counterclockwise direction represented in a hundredfold value. Note that the reference point for scaling is the top-left point of the reference block. For example, "rotation_degree=1250" indicates rotation of 12.5 degrees counterclockwise.

The "scaling_ratio" field indicates the scaling ratio S. This field indicates the scaling ratio of the block size of the reference target image in a hundredfold value. For example, "scaling_ratio=100" indicates 1 time (no magnification), "scaling_ratio=15" indicates 0.15-fold, and "scaling_ratio=366" indicates 3.66-fold.

Returning to FIG. 4, the compressed data buffer (cpb) 104 temporarily accumulates the encoded stream generated by the encoder 103. The TS formatter 105 reads the encoded stream accumulated in the compressed data buffer 104, converts the encoded stream into PES packets, further converts the encoded stream into transport packets, and multiplexes them to obtain a transport stream TS as a multiplexed stream. The transmitting unit 106 places the transport stream TS obtained by the TS formatter 105 on a broadcast wave or a net packet and transmits the transport stream TS to the receiving apparatus 200.

Operation of the transmitting apparatus 100 illustrated in FIG. 4 is briefly described. The moving image data of the omnidirectional image obtained by the omnidirectional camera 102 is supplied to the encoder 103. The encoder 103 encodes the moving image data VD according to AVC, HEVC, or the like, to obtain the encoded stream (video stream).

The encoder 103 performs motion compensation predictive coding. In extracting a motion-compensated reference block for each encoding target block, the reference block is subjected to rotation and/or scaling adjustment processing (see FIGS. 9 and 10). In the moving image data VD of the omnidirectional image, the residual signal can also be reduced and the encoding efficiency can be enhanced. Adjustment processing information is inserted into the encoded stream together with the motion vector for each encoding target block (see FIGS. 12 and 13).

The encoded stream generated by the encoder 103 is temporarily accumulated in the compressed data buffer (cpb) 104. In the TS formatter 105, the encoded stream accumulated in the compressed data buffer 104 are read out, converted to PES packets, further converted into transport packets, multiplexed, and a transport stream TS as a multiplexed stream is obtained.

The transport stream TS obtained by the TS formatter 105 is sent to the transmitting unit 106. In the transmitting unit 106, the transport stream TS obtained by the TS formatter 105 is transmitted on the broadcast wave or the net packet and is transmitted to the receiving apparatus 200.

<Configuration of Receiving Apparatus>

Figure 15:
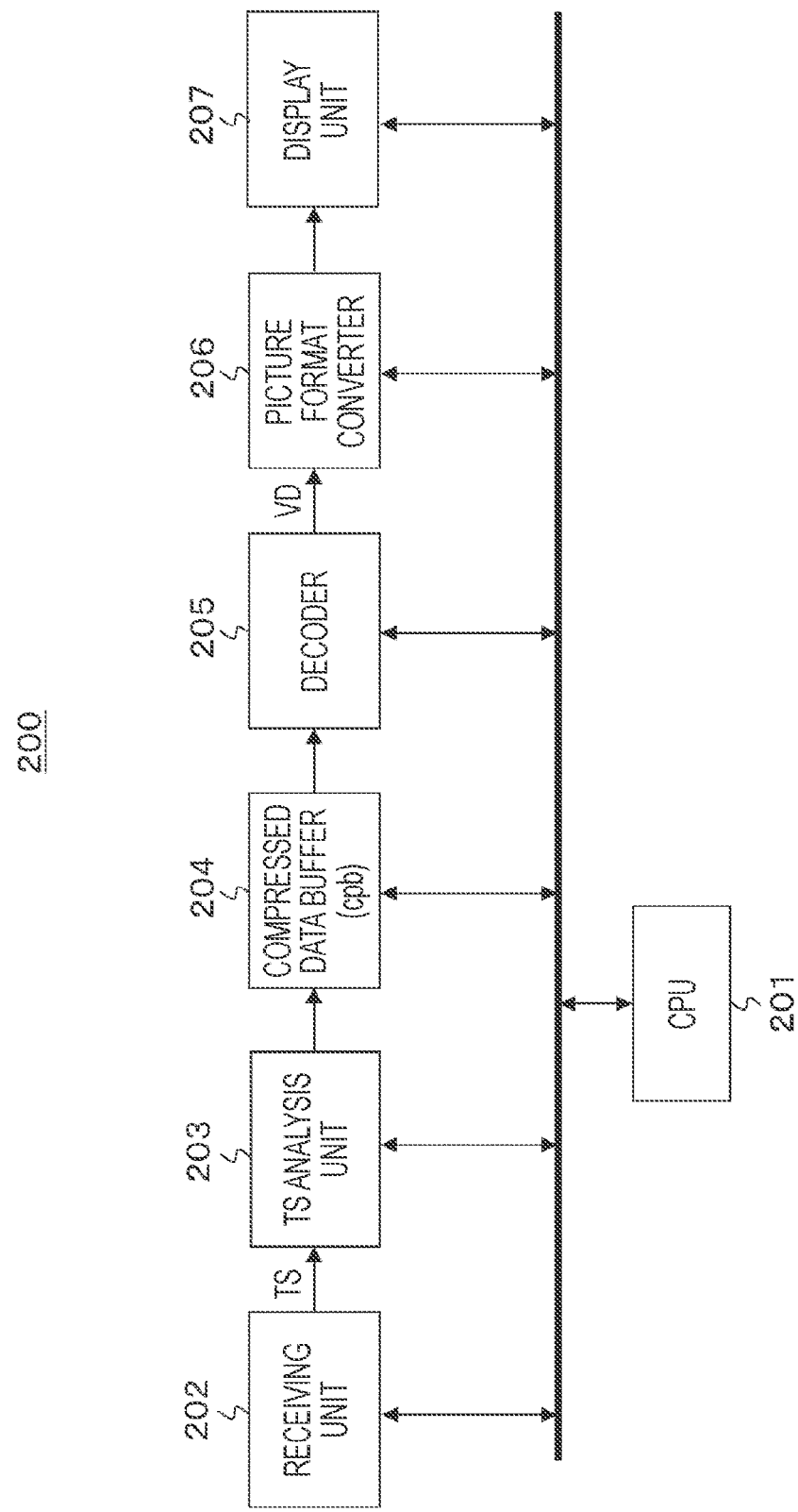
FIG. 15 is a block diagram of a configuration example of a receiving apparatus.

FIG. 15 illustrates a configuration example of the receiving apparatus 200. The receiving apparatus 200 includes a central processing unit (CPU) 201, a receiving unit 202, a TS analysis unit 203, a compressed data buffer (cpb: coded picture buffer) 204, a decoder 205, a picture format converter 206, and a display unit 207. The CPU 201 is included in a control unit and controls the operation of each unit of the receiving apparatus 200.

The receiving unit 202 receives the transport stream TS transmitted from the transmitting apparatus 100 on a broadcast wave or a net packet. The TS analysis unit 203 extracts an encoded stream (video stream) relating to the moving image data VD of the omnidirectional image included in the transport stream TS, and sends the encoded stream to the compressed data buffer 204. The encoded stream includes adjustment processing information (rotation angle θ and information of scaling ratio S) inserted into the encoded stream, together with the motion vector, for each coding target block. The compressed data buffer (cpb) 204 temporarily accumulates the video stream sent from the TS analysis unit 203.

The decoder 205 reads and decodes the coded image data of each picture accumulated in the compressed data buffer 204 at timing of decoding supplied in a decoding timing stamp (DTS) of the picture, thus obtaining the data VD. At this time, the decoder 205 extracts the reference block on the basis of the motion vector and the adjustment processing information for each decoding target block, and adds the pixel value of the reference block to the residual signal to obtain the moving image data VD.

Figure 16:
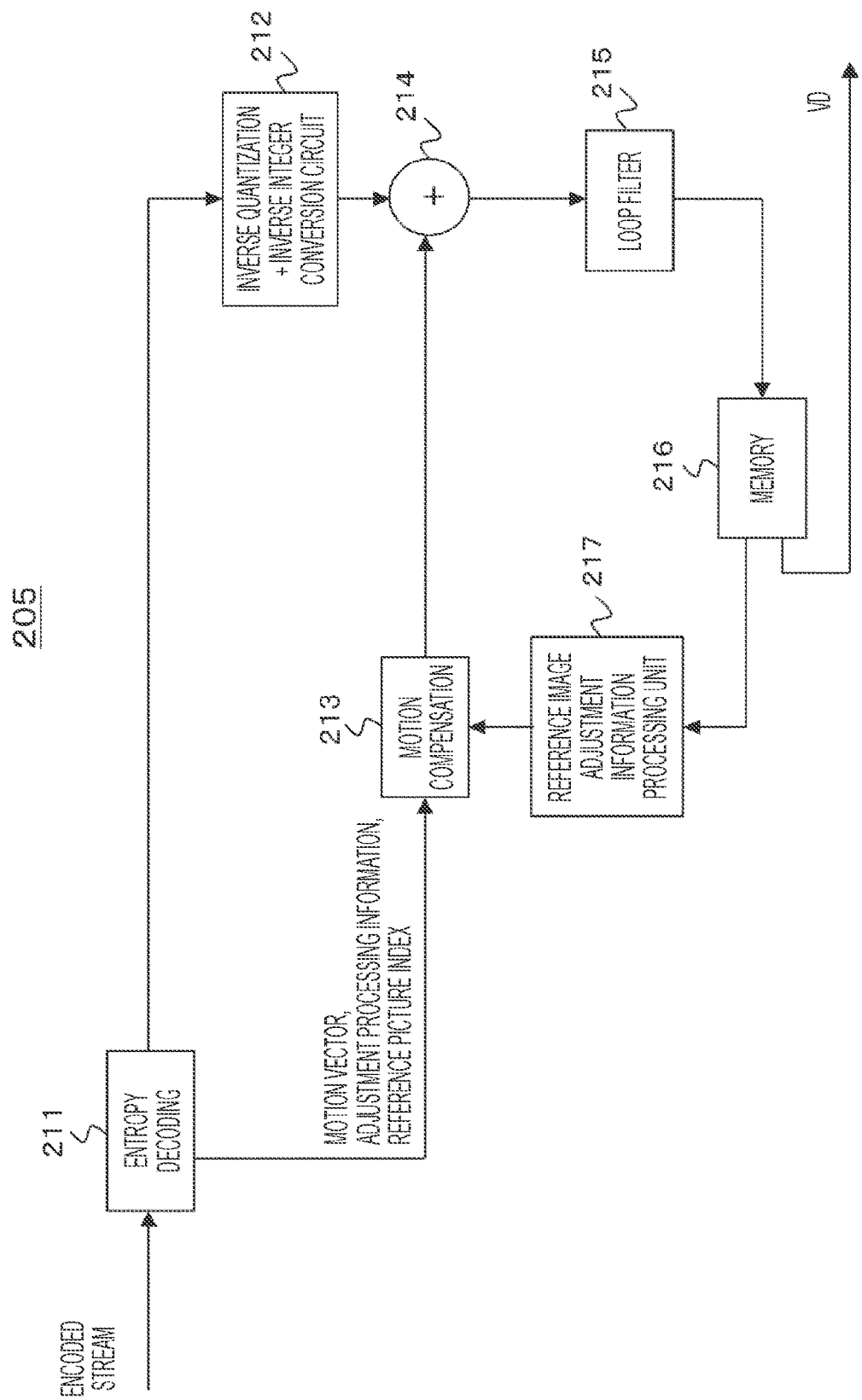
FIG. 16 is a block diagram of a configuration example of a decoding processing portion of a decoder in a receiving apparatus.

FIG. 16 illustrates a configuration example of the decoding processing portion of the decoder 205. The decoder 205 includes an entropy decoding circuit 211, an inverse quantization/inverse integer conversion circuit 212, a motion compensation circuit 213, an adder circuit 214, a loop filter 215, a memory 216, and a reference image adjustment information processing unit 217.

The entropy decoding circuit 211 performs entropy decoding in the encoded stream to obtain quantized data for each block to be decoded is obtained. This quantized data is supplied to an inverse quantization/inverse integer conversion circuit 212. The inverse quantization/inverse integer conversion circuit 212 applies inverse quantization to the quantized data, and further applies inverse integer transformation to obtain a prediction error (residual signal). The prediction error for each decoding target block is supplied to the adder circuit 214.

The motion compensation circuit 213 extracts the motion-compensated reference block (prediction reference block) for each decoding target block on the basis of the image data of the reference picture stored in the memory 216. In this case, the reference block subjected to adjustment processing is extracted, similarly to the case of coding, on the basis of the motion vector and the adjustment processing information inserted into the encoded stream for each block.

The reference blocks obtained by the motion compensation circuit 213 are sequentially supplied to the adder circuit 214. The adder circuit 214 adds the reference block corresponding to the prediction residual (residual signal) of individual decoding target blocks to obtain blocks constituting the moving picture data VD of the omnidirectional image. In this way, the blocks obtained by the adder circuit 214 in this manner are accumulated in the memory 216 after quantization noise is removed by the loop filter 215. Then, the moving image data VD of the omnidirectional image is obtained by reading the accumulated data from the memory 216.

Returning to FIG. 15, the picture format converter 206 performs image processing of panorama expansion on the moving image data VD of the omnidirectional images obtained by the decoder 205 to obtain image data for panorama display. The display unit 207 displays an image based on the display image data from the picture format converter 206. The display unit 207 includes, for example, a liquid crystal display (LCD), an organic electro-luminescence (EL) panel, or the like. Note that the display unit 207 may be an external device connected to the receiving apparatus 200.

Operation of the receiving apparatus 200 illustrated in FIG. 15 is briefly described. The receiving unit 202 receives the transport stream TS sent from the transmitting apparatus 100 in the form of a broadcast wave or a net packet. This transport stream TS is supplied to the TS analysis unit 203.

From the transport stream TS, the TS analysis unit 203 extracts an encoded stream (video stream) related to the moving image data VD of the omnidirectional image included in the transport stream TS, and sends the encoded stream to the compressed data buffer 204. The encoded stream temporarily accumulated the video stream sent from the TS analysis unit 203 in the compressed data buffer (cpb) 204 in which the adjustment processing information (the information of the rotation angle θ and the scaling ratio S) is inserted together with the motion vector for each coding target block in this encoded stream.

The decoder 205 reads and decodes the encoded image data of each picture accumulated in the compressed data buffer 204 at the decoding timing given by the decoding time stamp (DTS) of the picture to obtain the moving image data VD of the omnidirectional image. At this time, the decoder 205 extracts the reference block, similarly to the case of encoding, on the basis of the motion vector and adjustment processing information for each decoding target block, and adds the pixel value of the reference block to the residual signal to obtain the image data VD.

The moving image data VD of the omnidirectional image obtained by the decoder 205 is supplied to the picture format converter 206. The picture format converter 206 performs image processing of panorama development on the moving image data VD to obtain image data for display of panorama. In the display unit 207, an image is displayed by the display image data obtained by the picture format converter 206. In this case, the display unit 207 may display the entire image of the panorama, or selectively display only a partial range of images, for example, according to the selection operation by the user.

As described above, in the transmission/reception system 10 illustrated in FIG. 1, the transmission-side encoder 103 performs the adjustment processing of rotation and/or scaling on the reference block. Therefore, the residual can be reduced, the coding bit rate can be decreased, and consequently the coding performance of motion prediction can be improved.

Furthermore, in the transmission/reception system 10 illustrated in FIG. 1, the transmission-side encoder 103 inserts the adjustment processing information together with the motion vector for each encoding target block. Therefore, the decoder 205 on the reception image side can easily and appropriately obtain the motion-compensated reference block on the basis of the adjustment processing information together with the motion vector, and can easily and appropriately perform the decoding processing.

2. Modification

Note that the above embodiment has been described with the example of handling moving image data of the omnidirectional images. The present technology, however, is not limited to the moving image data of the omnidirectional image, and can be similarly applied to the case of handling moving image data of other wide viewing angle images.

Furthermore, the above-described embodiment has been described with the transmission/reception system 10 including the transmitting apparatus 100 and the receiving apparatus 200, but the configuration of the transmission/reception system to which the present technology is applied is not limited thereto. For example, the receiving apparatus 200 may have a configuration including a set-top box and a monitor connected via a digital interface such as a high-definition multimedia interface (HDMI), or the like, for example. Note that the term "HDMI" is a registered trademark.

Furthermore, the above-described embodiment has been described with the example in which the container is a transport stream (MPEG-2 TS). However, the present technology can be similarly applied to a system which allows distribution to receiving terminals using a network such as the Internet. The distribution via the Internet often uses a container in ISOBMFF (or MP4) or another format. That is, the container may be in various formats, such as the transport stream (MPEG-2 TS) adopted in the digital broadcasting standard, or ISOBMFF (or MP4) used in Internet distribution.

Furthermore, the present technology can also be configured in the following manner.

(1) A coding apparatus, including a block dividing unit that divides moving image data of a wide viewing angle image into blocks to obtain coding target blocks, a reference block extracting unit that extracts a motion-compensated reference block for each coding target block, a reference block adjusting unit that performs adjustment processing of rotation and/or scaling on the reference block, a coding unit that calculates a residual signal on the basis of a pixel value of the coding target block and a pixel value of the reference block subjected to the adjustment processing, for each coding target block, and encoding the residual signal of each coding target block to obtain an encoded stream, and an information inserting unit that inserts information of the adjustment processing together with a motion vector into the encoded stream, for each coding target block.

(2) The coding apparatus according to (1) above, in which the reference block adjusting unit automatically determines an angle of the rotation from positions of the reference block and the coding target block.

(3) The coding apparatus according to (1) or (2) above, in which the reference block adjusting unit performs rotation processing on each candidate before block matching in which the reference block extracting unit extracts the reference block.

(4) The coding apparatus according to (1) or (2) above, in which the reference block adjusting unit performs rotation processing on a result of block matching in which the reference block extracting unit extracts the reference block.

(5) A coding method, including the steps of dividing moving image data of a wide viewing angle image into blocks by a block dividing unit to obtain coding target blocks, extracting a reference block by a reference block extracting unit for each coding target block, performing adjustment processing of rotation and/or scaling on the reference block by a reference block adjusting unit, calculating a residual signal on the basis of a pixel value of the coding target block and a pixel value of the reference block subjected to the adjustment processing, for each coding target block, and encoding the residual signal of each coding target block to obtain an encoded stream by a coding unit, and inserting information of the adjustment processing, by an information inserting unit, together with a motion vector into the encoded stream, for each coding target block.

(6) A decoding apparatus, including a decoding unit that decodes an encoded stream, which includes a coding signal of each coding target block obtained by dividing moving image data of a wide viewing angle image into blocks, to obtain a residual signal for each decoding target block, the encoded stream including a motion vector and adjustment processing information of rotation and/or scaling inserted into the encoded stream to obtain a reference block, for each coding target block, and the decoding apparatus further including a reference block extracting unit that extracts a reference block for each decoding target block on the basis of the motion vector and the adjustment processing information for each block, and a pixel value calculating unit that adds a pixel value of the reference block to the residual signal for each decoding target block to obtain the moving image data of the wide viewing angle image.

(7) A decoding method, including a step of decoding an encoded stream of each coding target block obtained by dividing moving image data of a wide viewing angle image into blocks, to obtain a residual signal for each decoding target block by a decoding unit, the encoded stream including a motion vector and adjustment processing information of rotation and/or scaling inserted into the encoded stream to obtain a reference block, for each coding target block, and the decoding method further including extracting a reference block for each decoding target block on the basis of the motion vector and the adjustment processing information for each block by a reference block extracting unit, and adding a pixel value of the reference block to the residual signal for each decoding target block to obtain a moving pixel data of the wide viewing angle image by a pixel value calculating unit.

(8) A transmitting apparatus, including a coding apparatus that encodes moving image data of a wide viewing angle image to obtain an encoded stream, and a transmitting unit that transmits a container including the encoded stream in a predetermined format, in which the coding apparatus includes a block dividing unit that divides the moving image data of the wide viewing angle image into blocks to obtain coding target blocks, a reference block extracting unit that extracts a motion-compensated reference block for each coding target block, a reference block adjusting unit that performs adjustment processing of rotation and/or scaling on the reference block, a coding unit that calculates a residual signal on the basis of a pixel value of the coding target block and a pixel value of the reference block subjected to the adjustment processing, for each coding target block, and coding the residual signal of each coding target block to obtain the encoded stream, and an information inserting unit that inserts information of the adjustment processing together with a motion vector into the encoded stream, for each coding target block.

(9) A receiving apparatus, including a receiving unit that receives a container in a predetermined format including an encoded stream obtained by coding moving image data of a wide viewing angle image, and a decoding apparatus that decodes the encoded stream to obtain the image data of the wide viewing angle image, in which the decoding apparatus includes a decoding unit that decodes the encoded stream to obtain a residual signal for each decoding target block, the encoded stream including a motion vector and adjustment processing information of rotation and/or scaling inserted into the encoded stream to obtain a reference block, for each coding target block, and the decoding apparatus further includes a reference block extracting unit that extracts a reference block for each decoding target block on the basis of the motion vector and the adjustment processing information for each block, and a pixel value calculating unit that adds a pixel value of the reference block to the residual signal for each decoding target block to obtain the moving image data of the wide viewing angle image.

The main feature of the present technology is to apply rotation processing and/or scaling adjustment processing to the reference block, when performing predictive coding of moving image data of an omnidirectional image (wide viewing angle image), thus decreasing the residual and improving coding efficiency (see FIG. 6).

REFERENCE SIGNS LIST

10 Transmission and reception system
100 Transmitting apparatus
101 CPU
102 Omnidirectional camera
103 Encoder
104 Compressed data buffer
105 TS formatter
106 Transmitting unit
121 Blocking circuit
122 Subtraction circuit
123 Motion prediction/motion compensation circuit
124 Integer conversion/quantization circuit
125 Inverse quantization/inverse integer conversion circuit
126 Adder circuit
127 Loop filter
128 Memory
129 Reference image adjustment information processing unit
130 Entropy coding circuit
200 Receiving apparatus
201 CPU
202 Receiving unit
203 TS analysis unit
204 Compressed data buffer
205 Decoder
206 Picture format converter
207 Display unit
211 Entropy decoding circuit
212 Inverse quantization/inverse integer conversion circuit
213 Motion compensation circuit
214 Adder circuit
215 Loop filter
216 Memory
217 Reference image adjustment information processing unit

The invention claimed is:

1. A coding apparatus, comprising:
processing circuitry configured to:
divide moving image data of a wide viewing angle image into blocks to obtain coding target blocks,
extract a motion-compensated reference block for each coding target block,
perform adjustment processing of rotation and/or scaling on the reference block,
calculate a residual signal on a basis of (i) a pixel value of a coding target block that corresponds to the reference block and (ii) a pixel value of the reference block after the adjustment processing is performed on the reference block,
encode the residual signal of each coding target block to obtain an encoded stream, and
insert information of the adjustment processing together with a motion vector into the encoded stream, for each coding target block.

2. The coding apparatus according to claim 1, wherein the processing circuitry is further configured to automatically determine an angle of the rotation from positions of the reference block and the coding target block.

3. The coding apparatus according to claim 1, wherein
the processing circuitry is further configured to perform rotation processing on each candidate before block matching in which the reference block is extracted.

4. The coding apparatus according to claim 1, wherein
the circuitry is further configured to perform rotation processing on a result of block matching in which the reference block is extracted.

5. A decoding apparatus, comprising:
decoding circuitry configured to decode an encoded stream, which includes a coding signal of each coding target block obtained by dividing moving image data of a wide viewing angle image into blocks, to obtain a residual signal for each decoding target block,
the encoded stream including a motion vector and adjustment processing information of rotation and/or scaling inserted into the encoded stream to obtain a reference block, for each coding target block, and
the decoding apparatus further including processing circuitry configured to comprising:
   extract a reference block for each decoding target block on a basis of the motion vector and the adjustment processing information for each block, and
   add a pixel value of the reference block to the residual signal for each decoding target block to obtain the moving image data of the wide viewing angle image.

6. A transmitting apparatus, comprising:
a coding apparatus configured to encode moving image data of a wide viewing angle image to obtain an encoded stream; and
transmission circuitry configured to transmit a container including the encoded stream in a predetermined format, wherein
the coding apparatus includes processing circuitry configured to:
   divide the moving image data of the wide viewing angle image into blocks to obtain coding target blocks,
   extract a motion-compensated reference block for each coding target block,
   perform adjustment processing of rotation and/or scaling on the reference block,
   calculate a residual signal on a basis of (i) pixel value of a coding target block that corresponds to the reference block and (ii) a pixel value of the reference block after the adjustment processing is performed on the reference block,
   encode the residual signal of each coding target block to obtain the encoded stream, and
   insert information of the adjustment processing together with a motion vector into the encoded stream, for each coding target block.

7. A receiving apparatus, comprising:
receiving circuitry configured to receive a container in a predetermined format including an encoded stream obtained by encoding moving image data of a wide viewing angle image; and
a decoding apparatus configured to decode the encoded stream to obtain the image data of the wide viewing angle image, wherein
the decoding apparatus includes processing circuitry configured to:
   decode the encoded stream to obtain a residual signal for each decoding target block,
the encoded stream including a motion vector and adjustment processing information of rotation and/or scaling inserted into the encoded stream to obtain a reference block, for each coding target block, and
the decoding apparatus processing circuitry is further configured to:
   extract a reference block for each decoding target block on a basis of the motion vector and the adjustment processing information for each block, and
   add a pixel value of the reference block to the residual signal for each decoding target block to obtain the moving image data of the wide viewing angle image.

8. The coding apparatus of claim 1, wherein the wide viewing angle image is a panoramic 360 degree image.

* * * * *